Aug. 9, 1932.  W. P. NELSON  1,870,463
FRAMING LIGHT SHUTTER LIFTER
Filed April 21, 1930
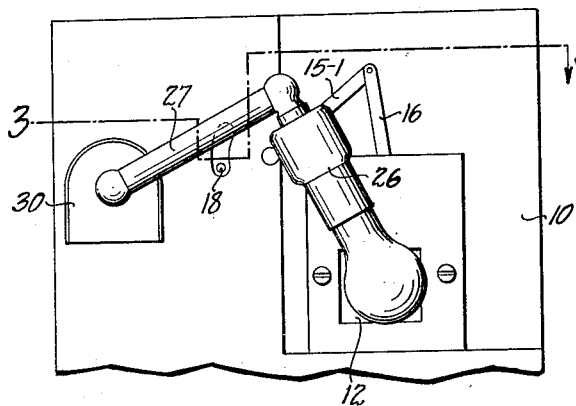
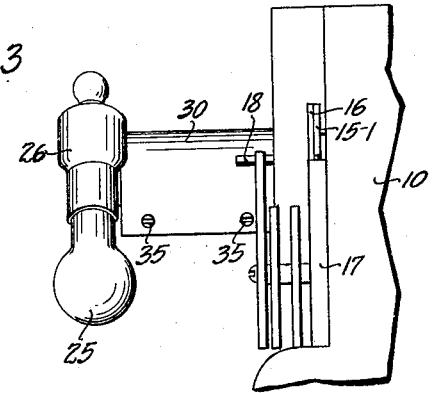
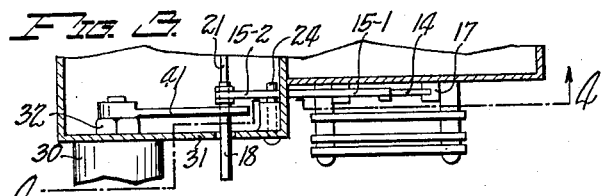
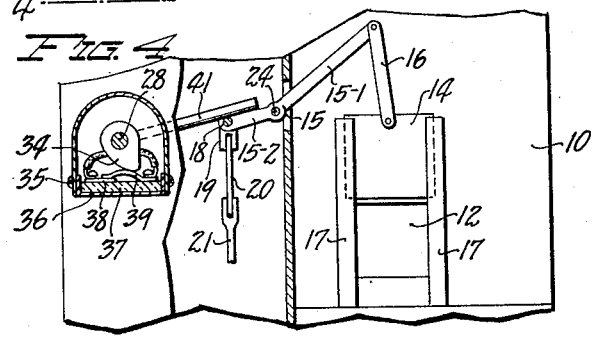
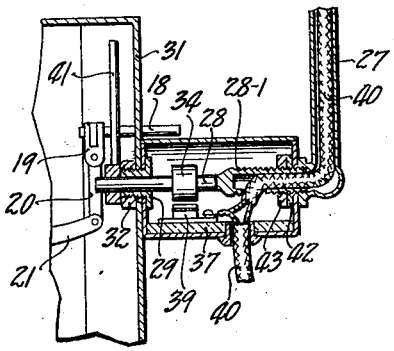
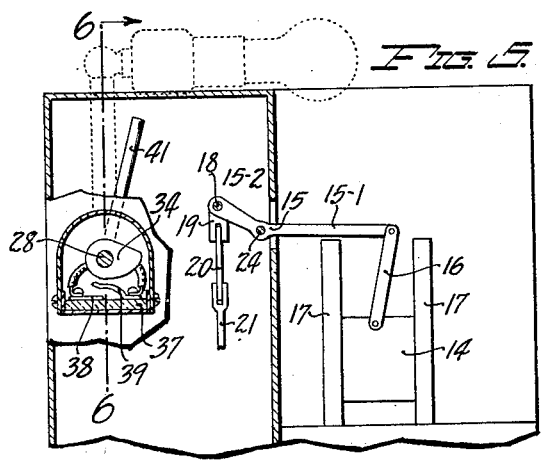
Inventor
WALDO P. NELSON,
By
H. Mallinckrodt
Attorney Patented Aug. 9, 1932

1,870,463

UNITED STATES PATENT OFFICE

WALDO P. NELSON, OF SALT LAKE CITY, UTAH

FRAMING LIGHT SHUTTER LIFTER

Application filed April 21, 1930. Serial No. 445,996.

This invention relates to a framing light shutter lifter for automatic fire shutters of motion picture projectors, especially motion picture projectors in which sound films are used.

Its principal objects are:

First: To provide simple, compact and efficient mechanism to facilitate the operation of threading and framing either sound motion picture film, or silent motion picture film.

Second: To automatically lift and hold open the usual automatic fire shutter when the framing light is in use.

Third: To be applicable as a built-in feature of new equipment, or as a convenient attachment to existing equipment.

Modern motion picture projectors are equipped with what is known as an automatic fire shutter in front of the aperture in which the picture is framed. This shutter extends over the aperture and protects the inflammable film from the fire hazard due to heat from the light used for projecting. Just ahead of the fire shutter, are so-called cooling plates whose purpose is to aid in diffusing the heat from the projection light in the lamp house.

When a projectionist threads a film in the projector, he places a small light, usually an incandescent electric lamp, opposite the aperture and uses his left hand to hold the fire shutter open, while with his right hand he manipulates the film so as to bring a frame of the film into coincidence or registry with the aperture plate. In sound pictures the threading is especially arduous, since the synchronization of sound and image is imperative, and moreover, must be performed quickly in the change of the reels.

Ordinarily, the left hand of the projectionist, during the threading operation, is necessarily in an extremely awkward position, and among other things is subject to painful burns from the cooling plates.

In the present invention, a framing light is provided at the end of a pivoted arm, with means for actuating a light switch and simultaneously actuating the fire shutter operating mechanism.

The features of this invention, for which the protection of letters patent of the United States is desired, are collectively grouped in the claims concluding this specification.

In the drawing:

Fig. 1 represents a fragmentary side elevation of a motion picture projector viewed from the operating position, with my new device applied thereto.

Fig. 2, a rear elevation corresponding to Fig. 1;

Fig. 3, a horizontal section taken on line 3—3, Fig. 2, parts broken away;

Fig. 4, a vertical section taken on line 4—4, Fig. 3;

Fig. 5, a vertical section similar to Fig. 4, but showing parts in alternate positions; and Fig. 6, a fragmentary section taken on line 6—6, Fig. 5.

Referring to the drawing, numeral 10 indicates a portion of the film trap of a motion picture projector. At 12 is the projection aperture defined by the usual frame in close proximity to the traveling film. At 14 is an automatic fire shutter suspended by a link 16 from the long arm 15—1 of a lift lever 15, which latter is pivoted on the lever screw 24. The automatic fire shutter is slidable vertically in guides 17 and is indirectly actuated through the lifting stud 18 which is rigidly mounted in the short arm 15—2 of the lift lever. Straddling the short arm 15—2 and pivoted on the lifting stud, is a crosshead 19, and pivoted in the lower part of the crosshead, is a link 20 to which in turn is pivoted the governer lift lever 21. The governor lift lever is fulcrumed on a suitable pivot (not shown) and is operated by an automatic governor (not shown).

The mechanism described so far, is embodied in the commercially known Simplex Projector, and of course is old.

One desirable form of my new framing light with automatic shutter operating mechanism for automatic fire shutter, may consist of an ordinary small incandescent electric lamp 25, which is removably held in the usual socket 26. This socket may be rigidly attached to a hollow arm 27, which in turn may be rigidly mounted, for instance by threading, on the hollow portion 28—1 of an oscillating switch shaft 28, one end of this shaft being journaled in the bushing 29, which latter, being externally threaded and of sufficient length to extend through wall 31 of the usual projector structure, also serves to hold the switch housing 30 securely in place by means of a lock nut 32. On the shaft 28 is rigidly mounted a cam 34 made of fiber or other insulating material.

A bottom plate 36 may be fastened in the lower part of the switch housing by means of screws 35, and secured on the plate 36 may be a block 37 made of fiber or other suitable insulating material. On this block may be mounted a switch clip 38 with which cooperates a switch blade 39. One terminal of a lamp cord 40 may be fastened to the clip 38 and the other terminal to the blade 39. The blade 39 is located in operative conjunction to the cam 34 which serves to bring the blade into contact with the clip when the shaft 28 is oscillated in the proper direction, as indicated in Figs. 4, 5 and 6.

The shaft 28 may protrude from the bushing 29 and have rigidly fixed thereon a substantially rigid finger 41, which is located so as to contact the lifting stud 18 when the arm 27 is depressed, as indicated in Figs. 2 and 4. The depression of arm 27 depresses the lifting stud 18, and by means of lever 15 and link 16, serves to lift the automatic fire shutter 14. Thus, when the lamp 25 is brought down into the position indicated in Figs. 1 and 2, the lamp will be lighted, and simultaneously, the aperture 12 uncovered, thereby establishing the proper conditions for threading the film and framing the picture. When the threading and framing of the film is completed, the projectionist merely pushes the lamp out of the way into substantially the position indicated in dotted lines in Fig. 5. This operation switches off the current and automatically causes the fire shutter to be dropped.

In order that the arm 27 may be positively held in any position, a friction washer 42, compressed by a nut 43, may be provided.

The distinctive feature of this invention is its simplicity which is secured by disposing the operating shaft of the device with its axis at substantially right angles to the plane of the fire shutter and to the plane of motion of its lifting lever, and furthermore, by mounting this shaft in a bearing which is attached directly to the wall of the projector structure and located in relatively close proximity to the fire shutter. It will also be noticed that the switch for supplying current to the lamp is very simple and is actuated directly by a fiber cam mounted on the operating shaft.

The simplicity of the device makes it inexpensive to manufacture, easy to attach to the projector structure, and extremely convenient in use.

The structure of a motion picture projector, including the automatic fire shutter, as herein shown and described, is old and well known and therefore forms no part of my invention excepting when used in combination with my improved framing light and shutter lifter.

While a specific embodiment of my invention is herein shown and described, it is to be understood that various changes could be made therein without departing from the spirit and scope of the invention as defined in the claims.

Having fully described my invention, what I claim is:

1. A framing light shutter lifter, including in combination, a motion picture projector having an automatic fire shutter, a shaft rotatably mounted on a wall of said projector, said shaft being disposed substantially at right angles to the plane of the fire shutter, a lamp having a framing position and a retracted position, said lamp being supported by said shaft and movable in inverse relation to the movement of said fire shutter, an aperture plate having an aperture in registry with said lamp in its framing position, and mechanism operative to transmit motion from said shaft to said automatic fire shutter in inverse relation to the movement of said lamp.

2. The combination with a motion picture projector having an automatic fire shutter lift lever and a lifting stud mounted in said lift lever, of a rotatable shaft having its axis substantially perpendicular to the plane of motion of said lift lever, a bearing for said shaft, said bearing being mounted in a wall of said projector, a framing lamp supported by said shaft, said lamp having an operative position and an inoperative position, an electric switch actuated by the movement of said framing lamp from the operative to the inoperative position and vice versa, and a member operative to automatically depress the said lifting stud when the said framing lamp is moved into the operative position.

3. The combination with a motion picture projector having an automatic fire shutter lift lever and a lifting stud mounted in said lift lever, of an oscillating shaft having its axis substantially perpendicular to the plane of motion of said lift lever, an arm extending substantially rigidly from said oscillating shaft, a cam in proximity to the arm, said arm being in engagement with said lifting stud, an operating arm extending rigidly from said oscillating shaft, a framing lamp supported by said operating arm, and a switch operative by means of said cam to energize said lamp due to the movement of the lamp into the framing position.

4. The combination with a motion picture projector having an automatic fire shutter lift lever and a lifting stud mounted in said lift lever, of a switch housing fixed on said motion picture projector in proximity to said lifting stud, an oscillating shaft within said housing, a switch operating cam fixed on said shaft, a substantially rigid arm fixed on said oscillating shaft, and operative to engage said lifting stud, switch members operative due to the oscillation of said cam, a lamp arm mounted on said oscillating shaft, and a framing lamp mounted on said lamp arm.

5. A motion picture projector, including in combination, an aperture plate, an automatic fire shutter in registry with the aperture in said aperture plate, an automatic fire shutter lift lever, a lifting stud fixed in said lift lever, an oscillating shaft operatively mounted in proximity to said lifting stud, said oscillating shaft having its axis substantially at right angles to the plane of the fire shutter, a bearing for said shaft, said bearing being mounted on a wall of said projector, a lifting stud arm mounted on said oscillating shaft and positioned so as to engage said lifting stud, and a lamp arm with framing lamp mounted on said oscillating shaft, said framing lamp having a registering position relatively to said aperture, and said lifting stud arm being operative to depress said lifting stud when said framing lamp is brought into the said registering position.

6. A motion picture projector, including in combination, an aperture plate, an automatic fire shutter in registry with the aperture in said aperture plate, an automatic fire shutter lift lever, a lifting stud fixed in said lift lever, a shaft bearing secured to a wall of said projector, the journal axis of said bearing being substantially perpendicular to the plane of the fire shutter, an oscillating shaft operatively mounted in said bearing, and a lifting stud arm mounted on said oscillating shaft so as to engage said lifting stud.

7. A framing light shutter lifter, including in combination, a motion picture projector having an automatic fire shutter, an oscillating shaft secured to a wall of said projector adjacent said shutter, said shaft being disposed with its rotative axis at substantially right angles to the plane of the shutter, a lamp arm mounted on said shaft, and means whereby said shutter is lifted when said lamp arm is lowered.

In testimony whereof, I sign my name hereto.

WALDO P. NELSON.